Figure 1:
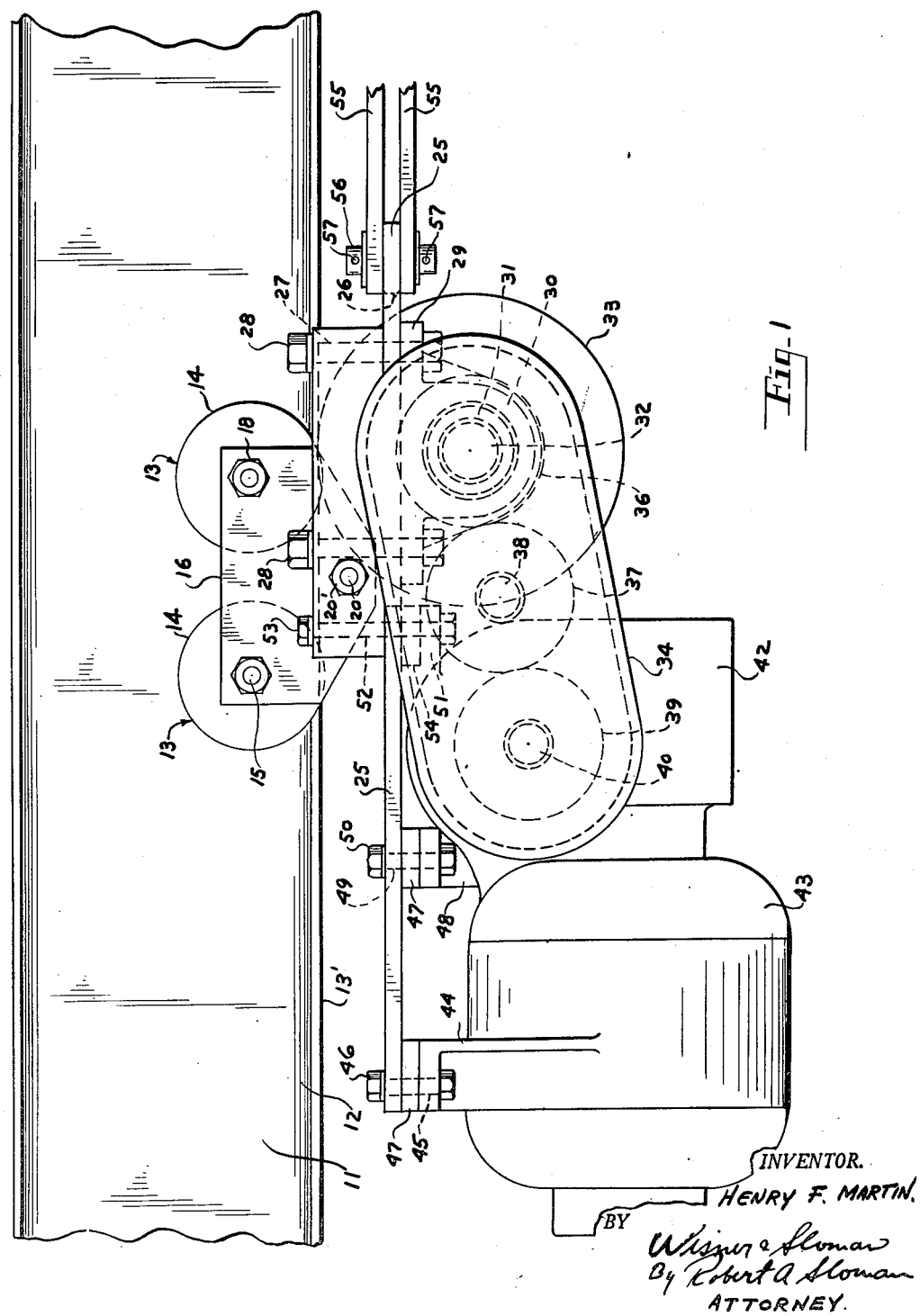

Aug. 26, 1952     H. F. MARTIN     2,608,163
MONORAIL TRACTOR

Filed July 13, 1950                                      2 SHEETS—SHEET 1

INVENTOR.
HENRY F. MARTIN.
BY Wisner & Sloman
By Robert A. Sloman
ATTORNEY.

Aug. 26, 1952  H. F. MARTIN  2,608,163
MONORAIL TRACTOR
Filed July 13, 1950  2 SHEETS—SHEET 2
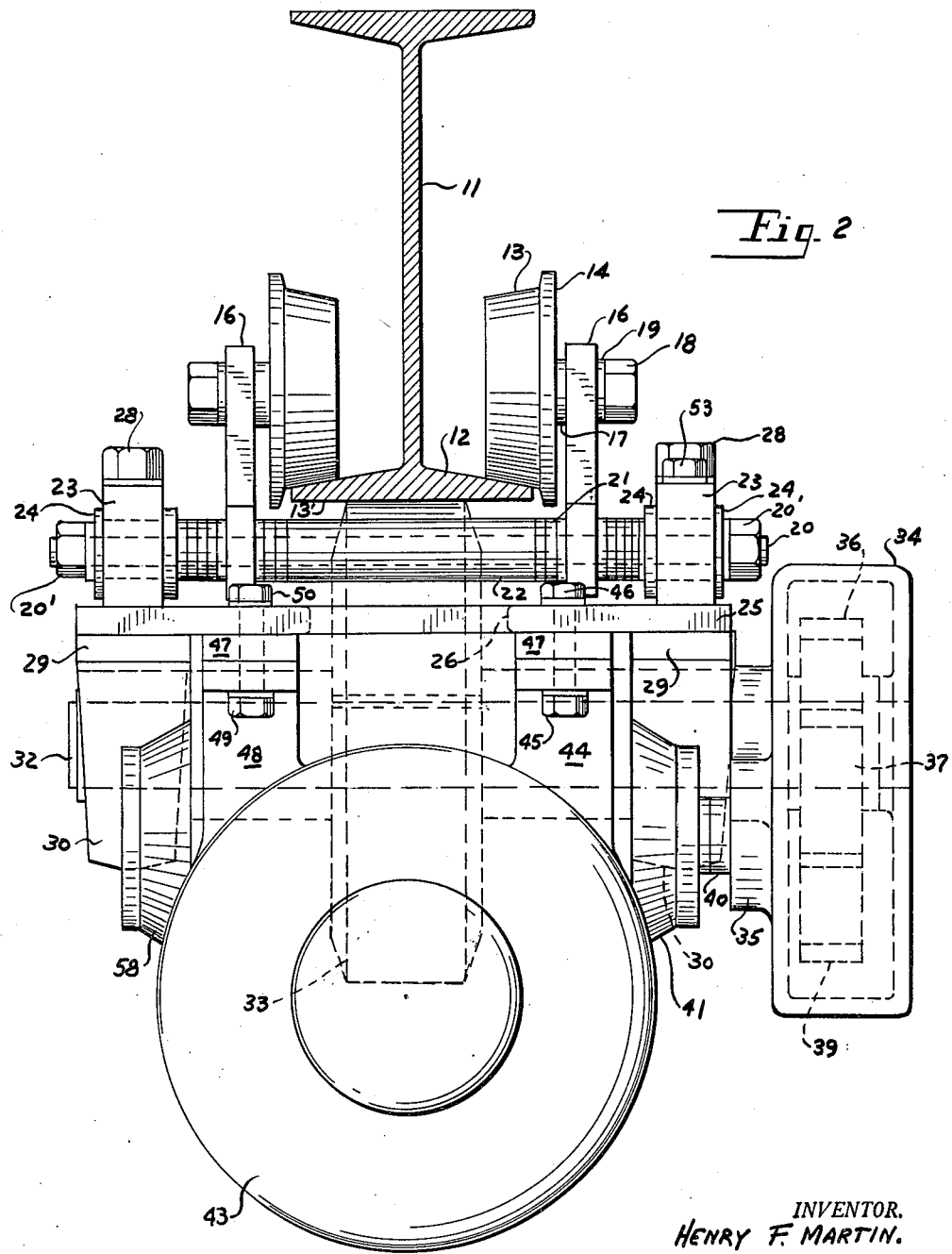
INVENTOR.
HENRY F. MARTIN.
BY *Wiesner Sloman*
By *Robert A. Sloman*
ATTORNEY.

Patented Aug. 26, 1952

2,608,163

UNITED STATES PATENT OFFICE 2,608,163

MONORAIL TRACTOR

Henry F. Martin, Centerline, Mich., assignor to Detroit Hoist and Machine Company, Detroit, Mich., a corporation of Michigan Application July 13, 1950, Serial No. 173,630

6 Claims. (Cl. 105—153)

This invention relates to a tractor construction, and more particularly to its combination with an I beam upon which it is supportably mounted.

It is the object of the present invention to provide a novel tractor construction which is movably supported upon an I beam and which depends therefrom and which includes a power operated driving means cooperatively engageable with a portion of the I beam for driving the tractor construction therealong.

This and other objects will be seen from the following specification and claims in conjunction with the appended drawings in which—

Fig. 1 is a side elevational view of the present tractor construction as mounted upon an I beam which is shown broken away at its ends; and Fig. 2 is a left end elevational view thereof, with the I beam shown in section.

It will be understood that the above drawings illustrate merely a preferred embodiment of the invention and that other embodiments are contemplated within the scope of the claims hereafter set out.

Referring to the drawings the upright I beam 11 with opopsitely extending downwardly inclined longitudinal flanges 12 and with a flat under surface 13', is supported within or upon a building structure in any conventional manner.

The present tractor construction is movably supported upon said flanges and depends from said I beam, being adapted for movement throughout the length of said beam in the manner hereafter described.

A pair of tapered rollers 13 with annular flanges 14 are rotatably supported upon the top surfaces of the inclined flanges 12 of I beam 11, being journaled upon the stud shafts 15. As will be apparent in Fig. 1 there are two pairs of such rollers 13 arranged upon opopsite sides of I beam 11 in the manner shown in Fig. 2.

A pair of upright wheel supports or roller supports 16 are arranged upon opposite sides of I beam 11 in spaced relation thereto, and the aforesaid stud shafts 15 are mounted thereon at their upper ends and secured thereto by the nuts 18 with suitable washers 17 and 19 interposed as shown in Fig. 2.

The transverse shaft 20 extends through corresponding openings in the lower ends of the roller supports 16 and is arranged below the bottom surface of said I beam as shown. The cylindrical spacer 22 as well as spacer washers 21 are arranged upon shaft 20 between the upright supports 16 as well as upon the outside thereof.

The outer ends of the shaft 20 extend through transverse openings in the rectangular elongated hinge blocks 23 which are supported in spaced relation adjacent the outer longitudinal edges of mounting plate 25.

Shaft 20 by means of the spacer washers 21 is adjustably positioned above the plate 25 and in spaced relation thereto with the opposite threaded ends of shaft 20 being immovably secured by the nuts 20' there being suitable retainer washers 24 provide upon opposite sides of the blocks 23.

As shown in the drawings the blocks 23 are secured upon the mounting plate 25 by the bolts 27 and securing nuts 28, said mounting plate having a central elongated slot 26.

A pair of spaced shaft supports 30 depend from the under surface of mounting plate 25 with their upper flanges 29 secured thereto by the aforesaid bolts 27. Suitable bearings or bushings 31 are positioned within the supports 30 and the transverse shaft 32 extends through said bearings, being rotatably supported upon the two supports 30 as shown in the drawing.

A hollow drive housing 34 with a hub 35 is arranged upon one side of the mounting plate 25, and the wheel shaft 32 extends outwardly through said hub and substantially through the housing 34. A suitable driven gear 36 is keyed or otherwise secured upon the end of the shaft 32 within the housing 34.

Said gear is in mesh with the idler pinion 37 which is positioned within housing 34 and rotatably mounted upon stud shaft 38 supported upon housing 34. Drive gear 39 is in mesh with idler 37, being mounted and secured within housing 34 upon the power outlet shaft 40 which projects through the hub 41 of the power take-off housing 42 which is secured to the electric motor 43.

Motor 43 has an upwardly extending mounting flange 44 which is secured to mounting plate 25 by the bolt 45 and the securing nut 46, with spacer 47 interposed. A second mounting flange 48 extends from the forward portion of motor 43 and is also secured to mounting plate 25 by the bolt 49 and its attaching nut 50, with a similar spacer 47 also interposed. An additional mounting flange 51 projects from the upper portion of power take-off housing 42 and is likewise secured to mounting plate 25 by the bolt 52 which extends up through the block 23 and which is immovably secured by the nut 53, there being a suitable spacer 54 also employed. Flange 51 provides additional means for securing power take-off housing 42 to the mounting plate 25.

The mounting plate 25 is provided at its forward end with a tow bar, or a pair of tow bars 55 which extend above and below said plate and which are pivotally joined thereto by the transverse connecting pin 56 which extends through corresponding openings in said tow bars and in said mounting plate. Transverse openings 57 are formed adjacent the ends of pin 56 for receiving a securing cotter pin or the like.

While the present construction shows power transmitting housing 34 arranged upon the right side of power take-off housing 42, it is seen from Fig. 2 that there is a second hub 58 upon the opposite side thereof through which a corresponding power take-off shaft could extend for driving a corresponding gear 39, in a similar manner to that shown and described with respect to Figs. 1 and 2.

The electric motor 43 is adapted when energized for driving the power take-off shaft 40 in one direction or the other, and this drive is transmitted through the intermeshing gears 39, 37 and 36 for driving the shaft 32 in one direction or the other. The wheel 33 secured upon shaft 32 is adapted to cooperatively and frictionally bear against the under surface 13' of I beam 11 whereby the mounting plate 25 may be moved longitudinally of the length of said I beam in one direction or the other.

It will be noted that the wheel 33 extends upwardly through the elongated slot 26 in the mounting plate 25 as illustrated in the drawings.

It is contemplated that there may be a pair of parallel spaced I beams with a crane construction suspended from either or both such beams and with a separate driving mechanism for each frame construction. On the other hand one such crane drive might be employed, with a suitable spacer beam joined to the above described frame construction and suitably supported at its other end by rollers upon the second I beam.

And it is apparent from Figs. 1 and 2 the hinge blocks 23 which are secured upon a mounting plate 25 upon opposite sides are pivotally or hingedly mounted upon the transverse shaft 20 which extends through the wheel supports 16. Furthermore it is apparent that the transverse wheel shaft 32 is arranged longitudinally forwardly of the shaft 20 upon one side thereof, whereas the motor 43, power take-up housing 42 and a portion of the gear housing 34 are arranged upon the opposite side of the shaft 20.

The weight of the mounting plate 25 and the motor 43 and power take-off 42 thus exert a pivotal trust about the supporting shaft 20 through the hinge block 23 to thereby forcefully project the driving wheel 33 against the under surface of the I beam 11.

The wheel 33 preferably has a rubber coating 33' which may be an artificial rubber such as neoprene or some other suitable substance.

By the hinged mounting of the plate 25 upon the shaft 20 through the hinge blocks 23 it is apparent that there will always be an upward thrust of the wheel 33 against the bottom surface 13' of I beam 11 to thereby establish a frictional relation between said wheel and I beam to facilitate the driving action of said wheel. It is contemplated depending upon the load to be drawn that this thrust of the wheel with respect to the I beam be increased, and this may be accomplished by the securing of an additional counter weight adjacent the end of mounting plate 25 above the motor 43.

Having described my invention reference should now be had to the claims which follow for determining the scope thereof.

I claim:

1. In combination with an I beam, a monorail tractor comprising a pair of upright roller supports upon opposite sides of said beam, rollers journaled upon said supports and movably bearing upon opposing flanges of said beam, a transverse shaft with its ends extending through the lower portion of said roller supports, a mounting plate having a central wheel receiving opening and hingedly supported upon the outer ends of said transverse shaft, a power driven rotatable shaft supported and journaled by and below said plate and arranged transversely of said beam, a driving wheel secured to said rotatable shaft and operatively bearing against the under surface of said beam for moving said rollers thereon, said rotatable shaft being positioned forwardly of said first transverse shaft, whereby the weight of said mounting plate upon said first transverse shaft effects a counter-clockwise upward thrust of said wheel against the under surface of said I beam.

2. In combination with an I beam, a monorail tractor comprising a pair of upright roller supports upon opposite sides of said beam, rollers journaled upon said supports and movably bearing upon opposing flanges of said beam, a transverse shaft with its ends extending through the lower portion of said roller supports, a mounting plate having a central wheel receiving opening, a pair of mounting blocks secured upon opposite sides of said plate and pivotally joined to the ends of the said shaft, a rotatable shaft supported and journaled by and below said plate and arranged transversely of said beam, a driving wheel secured to said rotatable shaft and operatively bearing against the under surface of said beam for moving said rollers thereon, and a motor suspended from said mounting plate and connected to said rotatable shaft, said rotatable shaft being arranged longitudinally forward of the first transverse shaft at a predetermined distance, and said motor being arranged longitudinally upon the other side of said shaft a predetermined greater distance, whereby the combined weight of said motor and mounting plate upon said first transverse shaft effects a counter-clockwise upward thrust of said wheel against the under surface of said I beam.

3. In combination with an I beam, a tractor construction comprising a pair of upright roller supports upon opposite sides of said beam, rollers journaled upon said supports and movably bearing upon opposing flanges of said beam, a mounting plate having a central wheel receiving opening at one end, a power driven rotatable shaft supported and journaled by and below said plate at said one end and arranged transversely of said beam, a driving wheel secured to said rotatable shaft and operatively bearing against the under surface of said beam for moving said rollers thereon, and a transverse shaft supportably extending through the lower portion of said roller supports with its opposite ends adjustably supported upon and above said mounting plate intermediate the ends of said plate and below said beam providing a pivotal mounting for said plate, whereby the weight of said mounting plate tends to rotate the same about said transverse shaft projecting said wheel into operative engagement with said beam.

4. In combination with an I beam, a tractor construction comprising a pair of upright roller supports upon opposite sides of said beam, rollers journaled upon said supports and movably bearing upon opposing flanges of said beam, a mounting plate having a central wheel receiving opening, a power driven rotatable shaft supported and journaled by and below said plate and arranged transversely of said beam, a driving wheel secured to said rotatable shaft and operatively bearing against the under surface of said beam for moving said rollers thereon, a pair of mounting blocks secured upon opposite sides of said mounting plate intermediate its ends, and a transverse shaft supportedly extending through lower portions of said roller supports with its opposite ends adjustably secured through corresponding openings in said blocks, providing a pivotal mounting for said plate, whereby the weight of said mounting plate tends to rotate the same about said transverse shaft projecting said wheel into operative engagement with said beam.

5. In combination with an I beam, a tractor construction comprising a pair of upright roller supports upon opposite sides of said beam, rollers journaled upon said supports and movably bearing upon opposing flanges of said beam, a mounting plate having a central wheel receiving opening, a power driven rotatable shaft supported and journaled by and below said plate and arranged transversely of said beam, a driving wheel secured to said rotatable shaft and operatively bearing against the under surface of said beam for moving said rollers thereon, a pair of spaced supports secured to and depending from opposite sides of said mounting plate, through which the ends of said rotatable shaft are supported, a transverse shaft extending through lower portions of said roller supports with its ends pivotally joined to said plate, an electric motor secured to and depending from said mounting plate and having a power take-off shaft, gears upon the corresponding ends of said power take-off shaft and wheel shaft, and a pinion between and intermeshing with said gears, said shafts being so arranged longitudinally of said plate that the weight of said motor and plate tends to effect a counter-clockwise pivotal movement of said plate about said transverse shaft projecting said wheel into operative engagement with said beam.

6. In combination with an I beam, a tractor construction comprising a pair of upright roller supports upon opposite sides of said beam, rollers journaled upon said supports and movably bearing upon opposing flanges of said beam, a mounting plate having a central wheel receiving opening, a rotatable shaft supported and journaled by and below said plate and arranged transversely of said beam, a driving wheel secured to said rotatable shaft and operatively bearing against the under surface of said beam for moving said rollers thereon, a pair of spaced supports secured to and depending from opposite sides of said mounting plate, through which the ends of said rotatable shaft are supported, a transverse shaft extending through lower portions of said roller supports with its ends pivotally joined to said depending supports, an electric motor secured to and depending from said mounting plate and having a power take-off shaft, gears upon the corresponding ends of said power take-off shaft and wheel shaft, a pinion between and intermeshing with said gears, and a gear housing for said gears within which said pinion is rotatably journaled, said motor being longitudinally spaced on one side of said transverse shaft, and said rotatable shaft being spaced upon the other side of said transverse shaft whereby the weight of said motor and plate tends to effect a counter-clockwise pivotal movement of said plate about said transverse shaft projecting said wheel into operative engagement with said beam.

HENRY F. MARTIN.

REFERENCES CITED

The following references are of record in the file of this patent:

UNITED STATES PATENTS

| Number | Name | Date |
|---|---|---|
| 2,168,986 | Harris | Aug. 8, 1939 |